(12) United States Patent
Rosskopf et al.

(10) Patent No.: US 7,084,647 B2
(45) Date of Patent: Aug. 1, 2006

(54) TRANSMITTER

(75) Inventors: Bernd Rosskopf, Hausen (DE);
Hans-Jorg Brock, Grenzach-Wyhlen (DE)

(73) Assignee: Endress + Hauser GmbH + Co. KG, Maulburg (DE)

( * ) Notice: Subject to any disclaimer, the term of this patent is extended or adjusted under 35 U.S.C. 154(b) by 0 days.

(21) Appl. No.: 10/507,205

(22) PCT Filed: Mar. 13, 2003

(86) PCT No.: PCT/EP03/02630

§ 371 (c)(1),
(2), (4) Date: Apr. 12, 2005

(87) PCT Pub. No.: WO04/001340

PCT Pub. Date: Dec. 31, 2003

(65) Prior Publication Data

US 2005/0179450 A1    Aug. 18, 2005

(30) Foreign Application Priority Data

Mar. 14, 2002  (DE) ................................ 102 11 771

(51) Int. Cl.
*G01R 27/08* (2006.01)
*G01D 18/00* (2006.01)
(52) U.S. Cl. ........................ 324/713; 702/104
(58) Field of Classification Search ................ 324/718, 324/715, 713, 691, 649, 600; 702/189, 104; 340/870.31, 870.37, 870.38; 73/1.15, 718, 73/1.57
See application file for complete search history.

(56) References Cited

U.S. PATENT DOCUMENTS

| | | | |
|---|---|---|---|
| 3,952,595 A * | 4/1976 | Poolman et al. | 374/175 |
| 4,783,659 A | 11/1988 | Frick | |
| 5,355,129 A * | 10/1994 | Baumann | 340/870.04 |
| 5,481,200 A | 1/1996 | Voegele | |
| 5,994,898 A * | 11/1999 | DiMarzio et al. | 324/244.1 |
| 6,253,770 B1 * | 7/2001 | Acker et al. | 128/899 |
| 6,532,436 B1 * | 3/2003 | Motz | 702/189 |
| 6,655,217 B1 * | 12/2003 | Bernauer et al. | 73/718 |
| 6,731,110 B1 * | 5/2004 | Church | 324/210 |
| 2003/0220757 A1 * | 11/2003 | Motz | 702/104 |
| 2004/0183550 A1 * | 9/2004 | Fehrenbech et al. | 324/662 |
| 2005/0149295 A1 * | 7/2005 | Pfundlin et al. | 702/189 |

FOREIGN PATENT DOCUMENTS

| | | |
|---|---|---|
| DE | 44 10 180 A1 | 9/1995 |
| DE | 196 09 290 A1 | 4/1997 |
| DE | 199 05 071 A1 | 10/2000 |

* cited by examiner

*Primary Examiner*—Diane Lee
*Assistant Examiner*—Hoai-An D. Nguyen
(74) *Attorney, Agent, or Firm*—Bacon & Thomas

(57) ABSTRACT

A transmitter having an improved current output is provided, having: a sensor (1), which serves to register a physical quantity (X) and to convert such to an electrical quantity; electronics, which converts the electrical quantity into a measurement signal and makes such available at an electrical current output in the form of a signal current (I) corresponding to the physical quantity; and a pick-up unit having a magnetoresistive element, whose resistance changes as a function of the magnetic flux (Φ) produced by the signal current (I).

6 Claims, 1 Drawing Sheet

TRANSMITTER

FIELD OF THE INVENTION

The invention relates to a transmitter.

BACKGROUND OF THE INVENTION

In the case of applications common in measuring and control technology, e.g. for inspection, control, and/or automation of complex processes, a multiplicity of transmitters, e.g. pressure, temperature, flow and/or fill level transmitters, are commonly in use.

A transmitter is usually composed of a transducer that registers a physical quantity and converts it to an electrical quantity, and an electronics that converts the electrical quantity into a measurement signal.

These transmitters frequently have an electrical current output, i.e. the transmitter regulates a current, incoming and outgoing, on a conductor pair, as a function of an instantaneous, measured value of the physical quantity. The measurement signal is a signal current in the case of these transmitters. In accordance with a standard common in measuring and control technology, the signal current is set as a function of the instantaneous, measured value to values between a minimum signal current of 4 mA and a maximum signal current of 20 mA.

The measurement signals are usually collected by a superordinated unit, e.g. a control and/or regulating unit. The superordinated unit supplies, as a function of the instantaneous measured values, display, control and/or regulating signals for the inspection, control and/or automation of a process. Examples of this are programmable logic controllers (PLC), process control systems (PCS) or personal computers (PC).

In the case of conventional transmitters, an ohmic measuring resistor is inserted in the conductor pair of the electrical current output. A voltage drop across this resistance is proportional to the instantaneous signal current, and can thus be referenced in the transmitter for regulating the signal current.

Although the use of such a measuring resistor is widespread, it is accompanied by some disadvantages. Often occurring over the conductor pair is not only the signal transmission, but also the supplying of power for the transmitter. For the transmitter with a limited supply voltage, e.g. 12 V, and a signal current determined by the present measured value, e.g. a current between 4 mA and 20 mA, only a limited amount of power is available for use. This small power is additionally reduced by the power loss through the resistance. Thus, even less power is available to the transmitter.

The power loss at the resistor is converted to heat. This heat is unwanted, especially in the case of operation where there is danger of explosion.

In order that a high measuring accuracy can be achieved, the resistance of the measuring resistor must be correspondingly large. The larger the resistance, however, the more power is lost at the sensor resistor and the more heat is formed.

A further disadvantage is that resistances of resistors are temperature-dependent. This temperature-dependence can lead to additional measuring errors.

SUMMARY OF THE INVENTION

It is an object of the invention, to provide a transmitter with an improved electrical current output.

To this end, the invention resides in a transmitter having a sensor,
    that serves to register a physical quantity and convert such into an electrical quantity,
an electronics,
    that converts the electrical quantity into a measurement signal and
    that makes the measurement signal available over an electrical current-loop output in the form of a signal current corresponding to the physical quantity, and
a pick-up unit,
    having a magnetoresistive element,
        whose resistance changes as a function of the magnetic flux produced by the signal current.

In one embodiment, a regulating circuit is provided for adjusting the signal current as a function of the measurement signal.

In another embodiment, the regulating circuit has a transistor, that is turned on by a measured-value-dependent control signal generated by the electronics.

In accordance with a further development, the pick-up unit is galvanically separated from the electrical current output.

In accordance with a further development, the instantaneous signal current registered by means of the pick-up unit is fed to the regulating circuit for regulating the physical-quantity dependent signal current.

In an embodiment, a regulating behavior of the regulating circuit can be adjusted by one or more adjustment variables.

In accordance with a further embodiment, the adjustment variables are stored in a memory and are digitally adjustable.

In accordance with a further development, the regulating circuit is embodied in the form of an integrated circuit, or the regulating circuit and the pick-up unit are embodied in the form of an integrated circuit.

In accordance with an embodiment, the integrated circuit also contains a circuit part, which generates a supply voltage for the transmitter, or parts thereof, from the signal current.

BRIEF DESCRIPTION OF THE DRAWINGS

The invention and further advantages will now be described further detail on the basis of the figures of the drawing showing examples of two embodiments of a transmitter; equal elements are provided in the figures with equal reference characters.

DETAILED DESCRIPTION OF THE PREFERRED EMBODIMENT

Figure 1:
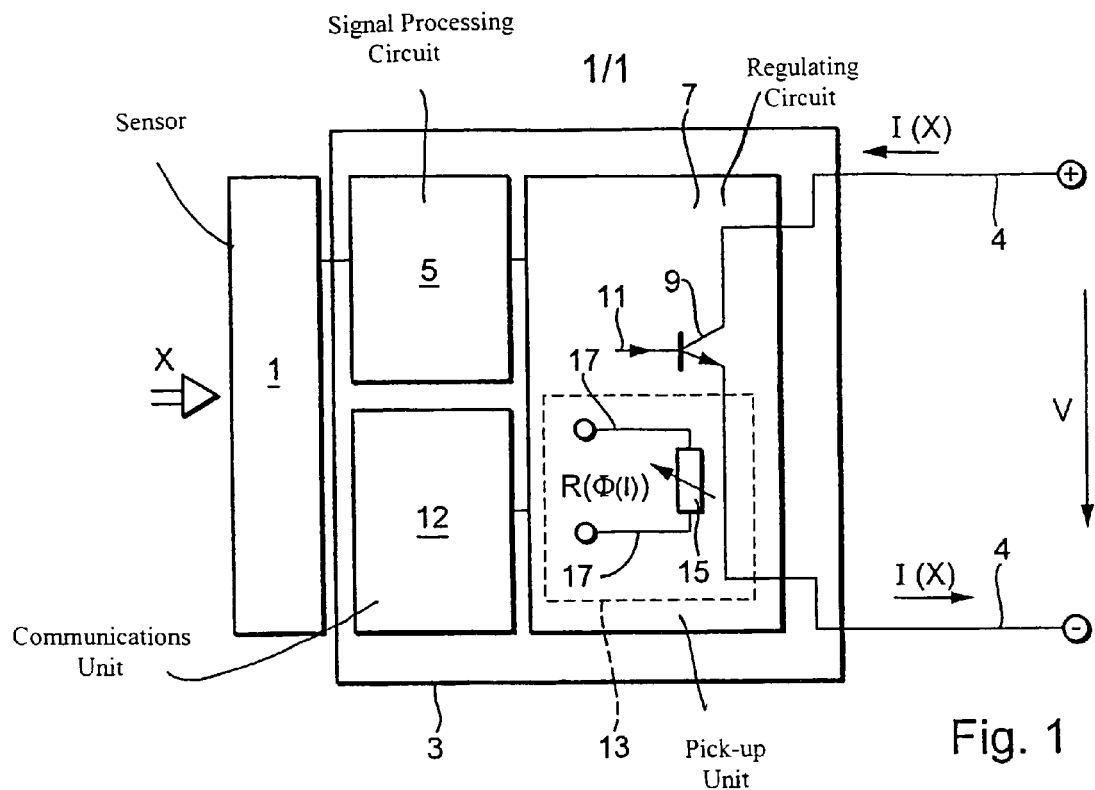
FIG. 1 shows a block diagram of a transmitter according to the invention.

FIG. 1 shows a block diagram of a transmitter according to the invention. The transmitter has a sensor 1 that serves to register a physical quantity X and convert such into an electrical quantity. The sensor can be e.g. a pressure-, temperature-, flow- or fill level sensor. The physical quantity X acts on the sensor 1 and the sensor, in turn, forwards an electrical quantity, in the form of an electrical signal corresponding to a present, measured value of the physical quantity X, to an electronics 3 attached to the sensor 1.

The electronics 3 converts the electrical quantity into a measurement signal and makes such available over an electrical current-loop output in the form of a signal current I corresponding to the physical quantity. For this purpose, the electrical current-loop output has two leads 4. The signal current I flows to the transmitter on a first lead 4 and then away from the transmitter on a second lead 4. During operation, a fixedly predetermined voltage V, e.g. at a level of 12 V, is present on the leads 4.

The electronics 3 includes a signal processing circuit 5, which conditions the electrical signal. This can include e.g. an amplifying of the signal, an effecting of possibly necessary error corrections and/or an adjustment of the signal with reference to calibration and/or compensation data.

An output signal of the signal processing circuit 5 is supplied to a regulating circuit 7, which is provided for adjustment of the signal current I as a function of the measurement signal.

Such a regulating circuit 7 has e.g. a transistor 9 inserted as a linear regulator into the current loop formed by the leads 4. A base of the transistor 9 is controlled with a measured-value-dependent control signal 11 produced by the electronics, e.g. by the signal processing circuit 5.

In addition, a communications unit 12 can be provided, serving e.g. serving to enable a unidirectional or bidirectional communication between the transmitter and a superordinated unit. The communication can occur e.g. by superimposing a communications signal, e.g. in sinusoidal or rectangular form, on the signal current I.

To regulate the signal current I as precisely as possible, a pick-up unit 13 is provided, that registers the instantaneous signal current I and makes such available to the regulating circuit 7. The pick-up unit 13 comprises a magnetoresistive element 15, whose resistance changes as a function of the magnetic flux Φ produced by the signal current I. The magnetoresistive element 15 is in the immediate vicinity of the leads 4 and extends preferably parallel thereto.

The instantaneous signal current I registered by the pick-up unit 13 is fed to the regulating circuit 7 for regulation of the physical-quantity-dependent signal current I.

A present resistance of the magnetoresistive element 15 is sampled via leads 17 connected thereto, e.g. by means of a resistance measuring circuit not shown in FIG. 1, and is directly available to the regulating circuit 7. It can e.g. be used for determining a deviation of the instantaneous signal current I from a desired value of the current and converted into a corresponding additional signal for superimposing on the control signal 11.

Alternatively, a measurement result from the resistance measuring circuit can also be fed to the signal processing circuit 5, which then issues a correspondingly modified control signal 11.

Preferably, the pick-up unit 13 is galvanically separated from the current output.

Figure 2:
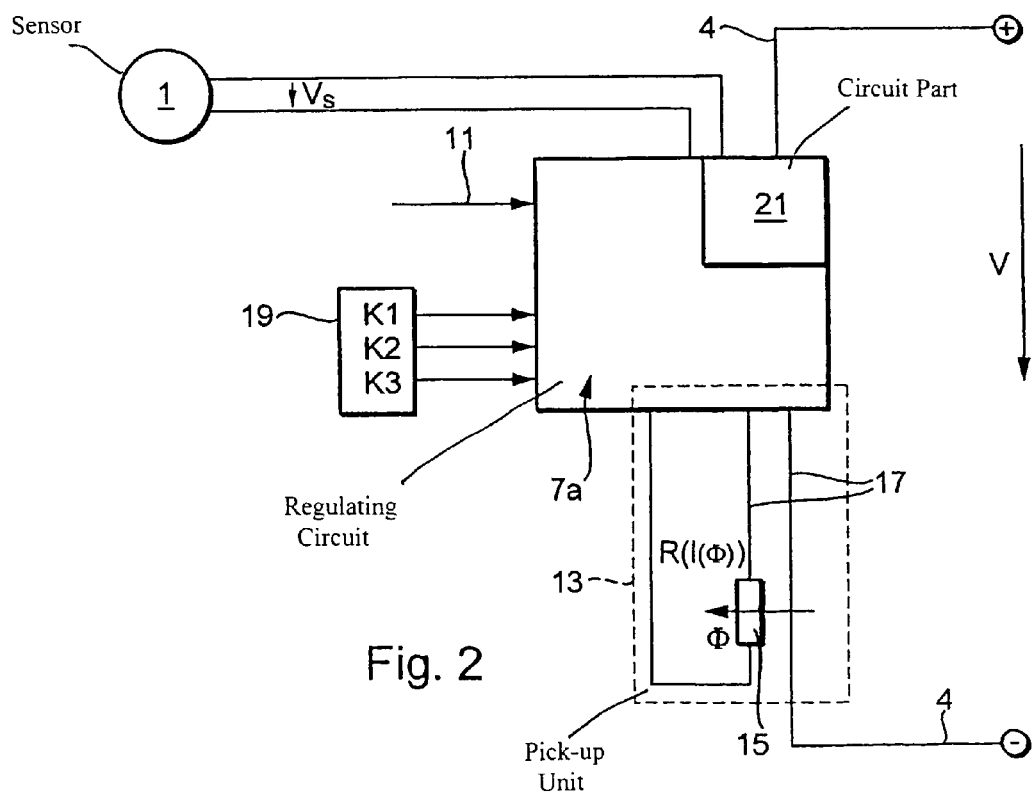
FIG. 2 shows a modification of the signal current regulating circuit of FIG. 1.

FIG. 2 shows another example of an embodiment of a regulating circuit 7a, likewise adapted for use in the transmitter of FIG. 1.

In contrast with situation in the regulating circuit 7 of FIG. 1, the regulating circuit 7a of FIG. 2 has a regulating behavior which is adjustable by one or more adjustment variables K1, K2, K3. Preferably, the adjustment variables K1, K2, K3 are stored in a memory 19 and are digitally adjustable. The main regulation is carried out also in this instance by the control signal 11. The adjustment variables K1, K2, K3 serve only for purposes such as compensating pick-up-specific characteristics, for instance zero-point displacement, or balancing a temperature dependence of the transmitter. The control signal 11 and the adjustment variables K1, K2, K3 are accessed in the regulating circuit 7a, together with the instantaneous signal current I determined from the pick-up unit 13, for the final adjustment of the signal current I.

The regulating circuit 7a is preferably provided in the form of an integrated circuit. In the same way, the regulating circuit 7a and the pick-up unit 13 can also be in the form of an integrated circuit.

A further component of such an integrated circuit is preferably a circuit part 21, which generates from the signal current I a supply voltage $V_s$ for the transmitter or parts thereof. A part of the transmitter can be e.g. the sensor 1, which is supplied by the circuit part 21 with the supply voltage $V_s$.

By the use in the invention of a magnetoresistive element 15 for registering the signal current, the transmitters of the invention do not need to have a resistor in the signal current circuit. The disadvantages connected with these ohmic resistors then do not appear.

Since the magnetoresistive element 15 is situated in an electrical current circuit independent of the current output formed by the leads 4, the resistance measurement can than be performed by means of a minimal measuring current. The resulting heat and energy loss are consequently very small, coupled with a relatively high accuracy of measurement.

The invention claimed is:

1. A transmitter comprising:
   a sensor that serves to register a physical quantity (X) and convert converts such into an electrical quantity;
   electronics that convert the electrical quantity into a measurement signal and that make the measurement signal available over an electrical current-loop output in the form of a signal current (I) corresponding to the physical quantity; and
   a pick-up unit having a magnetoresistive element, whose resistance changes as a function of the magnetic flux (Φ) produced by the signal current (I), wherein:
   said electronics include a regulating circuit for adjustment of the signal current (I) as a function of the measurement signal; and
   said regulating circuit has a transistor, that is turned-on in operation by a measured-value-dependent control signal generated by said electronics.

2. The transmitter as claimed in claim 1, wherein:
   said pick-up unit is galvanically separated from the electrical current-loop output.

3. A transmitter comprising:
   a sensor that serves to register a physical quantity (X) and convert converts such into an electrical quantity;
   electronics that convert the electrical quantity into a measurement signal and that make the measurement signal available over an electrical current-loop output in the form of a signal current (I) corresponding to the physical quantity; and
   a pick-up unit having a magnetoresistive element, whose resistance changes as a function of the magnetic flux (Φ) produced by the signal current (I), wherein:
   said electronics include a regulating circuit for adjustment of the signal current (I) as a function of the measurement signal;
   an instantaneous signal current registered by means of said pick-up unit is fed to said regulating circuit for regulation of the physical-quantity-dependent, signal current (I); and a regulating behavior of said regulating circuit is adjustable by one or more adjustment variables (K1, K2, K3).

4. The transmitter as claimed in claim 3, wherein:
the adjustment variables (K1, K2, K3) are stored in a memory and are digitally adjustable.

5. The transmitter as claimed in claim 3, wherein:
said regulating circuit is embodied as an integrated circuit, or
said regulating circuit and said pick-up unit are embodied as an integrated circuit.

6. The transmitter as claimed in claim 5, wherein:
said integrated circuit also contains a circuit part, which generates from the signal current (I) a supply voltage (V) for the transmitter or parts thereof.

* * * * *